United States Patent
Wilford (10) Patent No.: US 10,654,633 B2
(45) Date of Patent: May 19, 2020

(54) STIRRER COMPRISING A SEALED PACKAGE WHICH HOLDS THEREIN A LIQUID

(71) Applicant: Meta4sys Limited, St Helier (JE)

(72) Inventor: Martyn Sydney Wilford, Sherborne (GB)

(73) Assignee: Meta4sys Limited, St Helier (JE)

( * ) Notice: Subject to any disclaimer, the term of this patent is extended or adjusted under 35 U.S.C. 154(b) by 14 days.

(21) Appl. No.: 15/542,141

(22) PCT Filed: Jan. 8, 2016

(86) PCT No.: PCT/GB2016/050043
§ 371 (c)(1),
(2) Date: Jul. 7, 2017

(87) PCT Pub. No.: WO2016/110712
PCT Pub. Date: Jul. 14, 2016

(65) Prior Publication Data
US 2018/0265271 A1    Sep. 20, 2018

(30) Foreign Application Priority Data

Jan. 9, 2015 (GB) .................................. 1500351.0
Mar. 12, 2015 (GB) .................................. 1504155.1

(51) Int. Cl.
*B65D 75/32* (2006.01)
*A47G 21/00* (2006.01)
(Continued)

(52) U.S. Cl.
CPC ............ *B65D 75/326* (2013.01); *A45D 37/00* (2013.01); *A47G 21/004* (2013.01); *A47J 19/022* (2013.01);
(Continued)

(58) Field of Classification Search
CPC .... B65D 85/34; B65D 85/72; B65D 75/5855; B65D 75/36; B65D 75/326; B65D 75/54;
(Continued)

(56) References Cited

U.S. PATENT DOCUMENTS 1,676,102 A    7/1928   Thornton
2,103,389 A *  12/1937  Salfisberg .......... B65D 75/5811
                                                    156/183
(Continued)

FOREIGN PATENT DOCUMENTS

DE           29901266 U1    5/1999
DE        202005015085 U1   12/2005
(Continued)

*Primary Examiner* — Mollie Impink
(74) *Attorney, Agent, or Firm* — Carmody Torrance Sandak & Hennessey LLP (57) ABSTRACT

There is provided a pack (10) in the form of a stirrer for a hot or cold beverage. The stirrer comprises first and second films (13, 14) sealingly connected around a periphery to enclose a volume in which is disposed a liquid. The liquid is conveniently disposed in an elongate channel (15) formed in one of the films. Openable portions (17, 55) are provided at respective ends of the stirrer, one openable portion (17) allowing the liquid to flow out once opened and the other openable portion (55) acting as a vent. Each openable portion is opened by peeling apart the two films and has a stronger connection (52, 57) provided to limit the opening of the ends.

4 Claims, 6 Drawing Sheets

(51) Int. Cl.

| | | |
|---|---|---|
| *B65D 75/52* | (2006.01) | |
| *B65D 81/36* | (2006.01) | |
| *B65D 75/22* | (2006.01) | |
| *B65D 77/20* | (2006.01) | |
| *A45D 37/00* | (2006.01) | |
| *B65D 75/58* | (2006.01) | |
| *A61J 1/14* | (2006.01) | |
| *B65D 35/10* | (2006.01) | |
| *B65D 35/14* | (2006.01) | |
| *B65D 75/04* | (2006.01) | |
| *B65D 75/30* | (2006.01) | |
| *A47J 19/02* | (2006.01) | |
| *B65D 85/34* | (2006.01) | |

(52) U.S. Cl.
CPC ............ *A61J 1/14* (2013.01); *B65D 35/10* (2013.01); *B65D 35/14* (2013.01); *B65D 75/04* (2013.01); *B65D 75/22* (2013.01); *B65D 75/225* (2013.01); *B65D 75/30* (2013.01); *B65D 75/327* (2013.01); *B65D 75/52* (2013.01); *B65D 75/5855* (2013.01); *B65D 77/2024* (2013.01); *B65D 81/36* (2013.01); *B65D 85/34* (2013.01); *B65D 2221/00* (2013.01); *B65D 2577/2041* (2013.01); *B65D 2577/2066* (2013.01)

(58) Field of Classification Search
CPC ............ B65D 75/22; B65D 77/2036; B65D 77/2032; B65D 77/2024; B65D 77/2083; B65D 83/0055; B65D 83/0094; A47G 19/022; A47G 21/004; A47G 21/183; A47J 17/04; A47J 19/02; A47J 7/0038; A47J 7/003
USPC ............................................. 426/115
See application file for complete search history.

(56) References Cited

U.S. PATENT DOCUMENTS

| | | | |
|---|---|---|---|
| 2,648,463 A | 8/1953 | Scherer | |
| 2,688,914 A | 9/1954 | Eckler | |
| 3,159,096 A | 12/1964 | Tocker | |
| 3,207,610 A | 9/1965 | Belkin | |
| 3,669,013 A | 6/1972 | Stein | |
| 3,759,375 A | 9/1973 | Nappi | |
| 3,782,066 A | 1/1974 | Schmitt | |
| 3,917,116 A | 11/1975 | Mason | |
| 4,674,633 A | 6/1987 | Steadman | |
| 4,863,036 A * | 9/1989 | Heijenga | B65D 77/2036 229/123.1 |
| 4,871,091 A * | 10/1989 | Preziosi | A61F 9/0008 222/92 |
| 4,895,296 A | 1/1990 | Trauschke | |
| 4,921,137 A | 5/1990 | Heijenga | |
| 5,154,293 A | 10/1992 | Gould | |
| 5,975,305 A | 11/1999 | Barger | |
| 8,535,744 B1 | 9/2013 | Taghaddos | |
| 2007/0119862 A1 | 5/2007 | Backes et al. | |
| 2008/0112750 A1* | 5/2008 | Thomson | B65D 75/5811 401/132 |
| 2010/0115891 A1 | 5/2010 | Sharp et al. | |
| 2011/0079609 A1 | 4/2011 | Lee | |
| 2012/0223099 A1 | 9/2012 | Sanchez | |
| 2013/0015085 A1 | 1/2013 | Morimoto et al. | |
| 2013/0341350 A1 | 12/2013 | Montarras et al. | |
| 2014/0138382 A1* | 5/2014 | Willemsen | B65D 75/58 220/266 |
| 2014/0228785 A1 | 8/2014 | Soll et al. | |
| 2014/0329039 A1* | 11/2014 | Neuman | B32B 27/08 428/36.6 |

FOREIGN PATENT DOCUMENTS

| | | | | |
|---|---|---|---|---|
| DE | 202007010049 U1 | 9/2007 | | |
| DE | 20201108630 U1 | 2/2012 | | |
| EP | 0003390 A1 | 8/1979 | | |
| EP | 0303500 A2 | 2/1989 | | |
| EP | 2085322 A1 | 8/2009 | | |
| EP | 2279964 A1 | 2/2011 | | |
| FR | 2773683 A1 | 7/1999 | | |
| GB | 854485 A * | 11/1960 | | B65D 75/42 |
| GB | 991495 | 5/1965 | | |
| GB | 2343440 A | 5/2000 | | |
| GB | 2478109 A | 8/2011 | | |
| JP | 2001018989 | 1/2001 | | |
| JP | 2002104541 A | 4/2002 | | |
| JP | 2008247420 A | 10/2008 | | |
| JP | 1190185 B2 | 12/2008 | | |
| WO | 199948768 | 9/1999 | | |
| WO | 200126994 A1 | 4/2001 | | |
| WO | 200176973 A2 | 10/2001 | | |
| WO | 2002070352 A2 | 9/2002 | | |
| WO | 2003094680 A1 | 11/2003 | | |
| WO | 2006117178 A1 | 11/2006 | | |
| WO | 2007126817 A2 | 11/2007 | | |
| WO | 2009006690 A1 | 1/2009 | | |
| WO | 2010123581 A2 | 10/2010 | | |

* cited by examiner

STIRRER COMPRISING A SEALED PACKAGE WHICH HOLDS THEREIN A LIQUID

The present invention relates to a pack, and more particularly to a pack for dispensing a liquid.

Some fresh fruits are used in the food and drink industries for the juice held within the fruit. It is often desirable to squeeze the fruit in order to extract the juice from the fruit and direct the juice over food or into a drink. In kitchens and bars, therefore, it is common for fruit, such as citrus fruits (lemons, limes), to be sliced or cut ready for use. This can, however, lead to wastage if the slices are not used within an acceptable timeframe. Also, squeezing the slices can be messy in that residue is left on fingers and in that the direction of the juice being extracted is not always predictable. Additionally, sometimes it is desirable to use the fruit after juice has been extracted.

Furthermore, fruit production is generally seasonal and can be vulnerable to poor growing seasons as well as good growing seasons. Good seasons may lead to over-production of a particular fruit which can result in wastage and poor seasons may lead to shortages and/or increased prices. A more steady and predictable supply could be beneficial.

Often it is desirable to add fruit juice to a beverage in order to add flavour or taste or to add an alternative supplement to a beverage. Examples of such fruit juices are lemon and lime juices but other juices such as orange or blackcurrant can also be desirable. Indeed any juice can be utilised with the present invention and a good example of an alternative liquid supplement would be honey. It is common to stir such liquid products into hot drinks such as tea or coffee or cold drinks and the present invention provides a suitable device for dispensing the liquid and stirring. The device provides a single-use device intended to dispense a pre-determined amount or amounts of liquid.

According to a first aspect of the present invention there is provided a stirrer comprising a sealed package which holds therein a liquid and which comprises a first film and a second film sealingly joined to each other, said films being fluid tight and fully enclosing therebetween an elongate volume in which the liquid is sealingly retained, wherein the package has a first openable portion at one end and a second openable portion at an opposite end such that when both openable portions are opened the liquid is able to flow out of the opened first openable portion and the second openable portion acts as a vent, wherein each openable portion comprises at least one of the two films having a grippable tab which can be manipulated to peel apart the joint between the films, and wherein the connection between the films is weaker in the region of each openable portion compared to the connection on either side of the openable portion, thereby resisting separation of the films beyond a predetermined amount at each openable portion.

In some embodiments the films are made from food-grade plastics materials, the first film is flexible and the second film is sufficiently rigid to maintain its shape during and after dispensing of the liquid via the first openable portion. Sometimes the maximum opening of the first openable portion is greater than that of the second openable portion.

In preferred arrangements the joint between the first and second films includes a first seal portion in the region of the first openable portion which is relatively weak compared to second seal portions on each side of the first seal portion whereby the second seal portions effect said resistance to further separation to limit the opening of the first openable portion. Often the joint between the first and second films includes a third seal portion in the region of the second openable portion which is relatively weak compared to fourth seal portions on each side of the third seal portion whereby the fourth seal portions effect said resistance to further separation to limit the opening of the second openable portion. In some arrangements each of the second seal portions is contiguous with a respective one of the fourth seal portions, the first openable portion being at an opposite end of the stirrer to the second openable portion.

With further preferred arrangements the first and third seal portions are parts of a continuous peripheral seal between the two films to enclose said volume and the second and fourth seal portions are in the form of additional joints between the two films. With some of these embodiments the second and fourth seal portions are spaced from said peripheral seal.

In one preferred type of construction the second film incorporates a closed-ended channel in which the liquid is disposed, the first film sealing all around the periphery of the channel to retain the liquid, the first film being peelable from the second film at each end of the channel to open the two openable portions.

In some constructions the stirrer comprises one or more further sealed elongate volumes, each having a first and a second openable portion and each containing a liquid. Usually the sealed elongate volumes extend in the same lengthwise direction as each other and are laterally offset from each other.

With some constructions the openable portions of each elongate volume are separately openable to dispense separately the individual liquids contained in the elongate volumes. Often the separate elongate volumes are defined by a single second sheet and an individual first sheet for each elongate volume. Sometimes the lengths of the elongate volumes are different such that the first openable portions are at different locations in the lengthwise direction and it is possible that a single grippable tab of a single first sheet opens the first openable portions sequentially.

In certain embodiments said second film is arranged in the shape of an elongate triangular cylinder, at least one of the three sides incorporating one or more of said channels bulging inwardly into the interior of the cylinder.

It is also possible that each side of said cylinder incorporates one or more of said channels.

Usually the or each elongate volume has straight parallel lengthwise sides.

In other arrangements the or each volume has a main volume and an elongate secondary volume extending therefrom and communicating therewith, the first openable portion being provided at the end of the secondary volume remote from the main volume, and an elongate tertiary volume which extends from the main volume and in communication therewith, the second openable portion being provided at the end of the tertiary volume remote from the main volume, the secondary and tertiary volumes extending in opposite directions from the main volume.

Embodiments of the present invention will be described in more detail. The description makes reference to the accompanying diagrammatic drawings in which.

In the various embodiments of the present invention described below, many features are shared by the embodiments and so like features have been given like reference numerals. Similarly, some embodiments can be readily combined such that an end product may incorporate two or more of the features which are described individually below, thereby compounding the advantages provided.

Figures 1, 2:
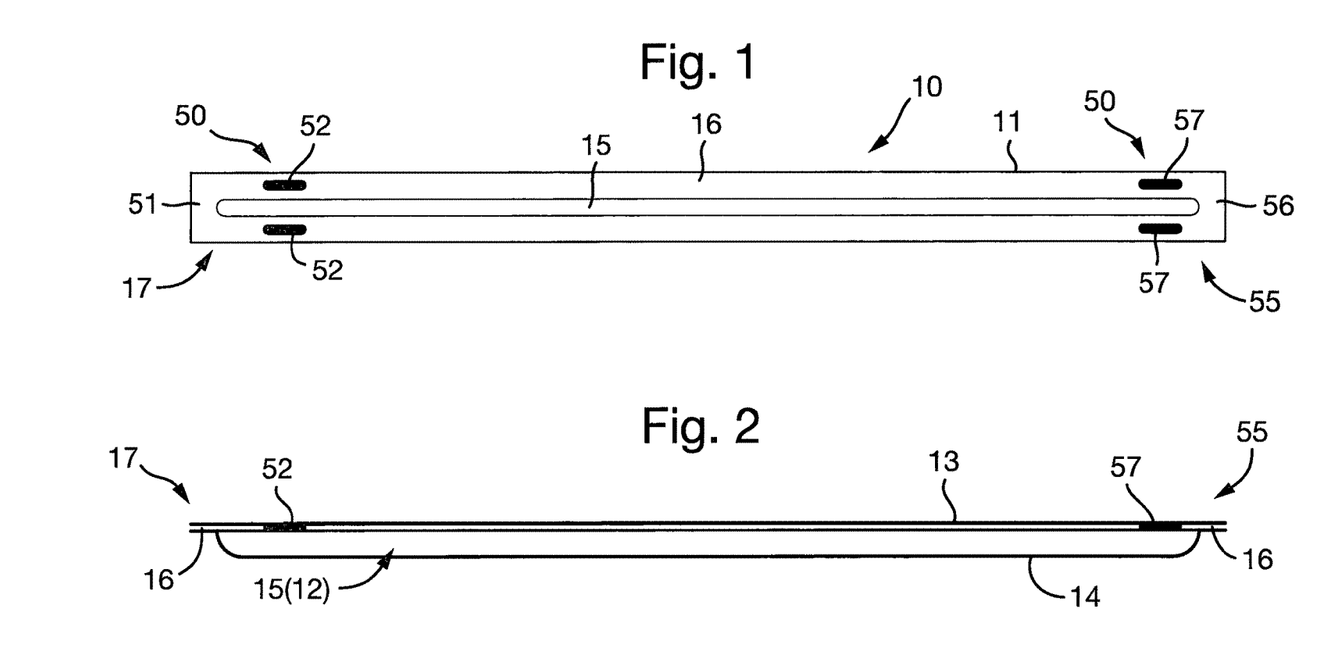
FIG. 1 is a front view of a stirrer according to the present invention.
FIG. 2 is a lengthwise sectional view of the stirrer of FIG. 1.
Figure 3:
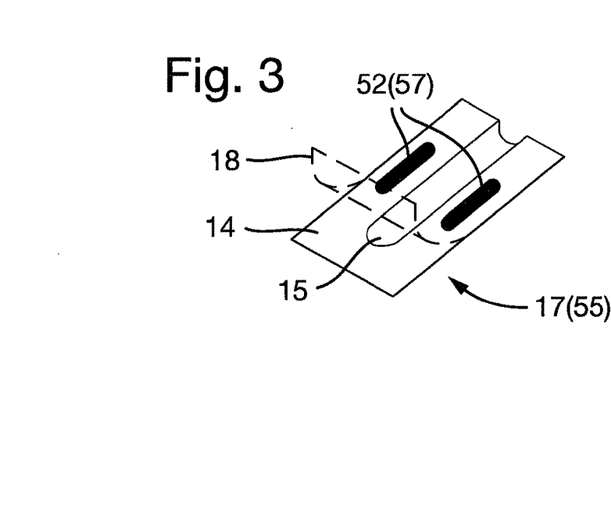
FIG. 3 is a large scale perspective view of one end of the stirrer.

In FIGS. 1 to 3, there is disclosed a basic pack in the form of a stirrer 10 comprising a sealed package 11 in which is sealingly retained a liquid. In the embodiment shown, the sealed package 11 is formed from two fluid-tight films 13, 14. In this arrangement, the first film 13 is a flexible food-grade plastic film and the second film 14 is a more rigid food-grade plastic film, both films being made from appropriate materials known in the food industry. In other arrangements, one or both films could be made from other liquid impervious materials such as plastic-coated board/paper. In the embodiment shown, the liquid is disposed in a closed-ended channel 15 formed in the second film 14 and may be in liquid form or frozen during manufacture of the stirrer 10. The channel 15 is shown as having straight parallel sides and being narrow compared to its length but other shapes are of course possible.

In FIG. 1, around the channel 15 the films 13, 14 are sealingly joined together so as to fully enclose the liquid 12 within the volume of the stirrer during manufacture of the pack 10. The sealed joint 16 between the two films 13, 14 is formed in one of a number of ways such as heat sealing, welding, adhesive or using a combination of these, and the process may involve shrink-wrapping or connection of pre-moulded film members. The films 13, 14 are shown as spaced apart for clarity in FIG. 2 and other figures but are in fact sealed together.

It will be appreciated that if the liquid contained in the product is not a foodstuff then the films 13, 14 need not be made of a food-grade material.

Furthermore, the relative flexibility of the films 13, 14 is not always important. In the embodiments described herein the second film 14 is usually relatively rigid compared to the first film 13, usually so that the second film 14 has sufficient structural integrity to retain a particular shape or formation formed therein or thereon and for the stirrer to retain its shape when being used to dispense liquid and stir. However a separate lengthwise stiffening member or spine could be attached to flexible films in order to provide structural integrity.

The stirrer 10 has a first openable portion 17 at one end. In the embodiments shown, the first openable portion 17 is in the form of an easy-peel opening which is known in the packaging industry. Usually, this will comprise one or both of the films 13, 14 having a grippable tab 18 which can be manipulated so as to break or peel apart the sealed joint 16 by separating the films 13, 14 at the first openable portion such that the enclosed volume of the stirrer communicates with the exterior. There is provided a second openable portion 55 at an opposite end to the first openable portion 17. Again, the second openable portion 55 is in the form of an easy-peel opening in which one or both of the films 13, 14 has a grippable tab 18 which can be manipulated to break the sealed joint between the films 13, 14. In use of the stirrer 10, both openable portions 17, 55 are opened, the second openable portion 55 acting as a vent such that the liquid can flow easily out of the first openable portion 17 which would be placed in a hot or cold beverage such as, but not limited to, tea.

FIG. 2 illustrates the opening of the first openable portion 17 with the grippable tab 18 of the first film 13 being peeled away from the second film to expose the open face of the end of the channel 15. This, of course, enables the liquid to be dispensed from the stirrer and is similar to the opening of the second openable portion 55.

In addition to the standard peripheral seal 16, there is also provided a further connection between the two films 13, 14 around part of the periphery, as indicated by reference numeral 50. The further connection 50 can take a number of forms. The heat seal/weld or adhesive may simply be made stronger in the region 50 compared to the basic sealed joint 16. Alternatively, there may be an additional joint in the connection 50 such as an adhesive connection in addition to a basic heat seal/weld extending around the entire periphery. It is, however, essential that the further connection 50 is not present in the region of the first and second openable portions.

The result is that the seal between the films 13, 14 in the region of the first openable portion, i.e. a first seal portion 51, is relatively weak compared to the portions of the seal on each side due to the stronger, further connection 50, i.e. second seal portions 52. When the pack 10 is to be opened by peeling one of the films 13, 14 from the other, the first seal portion 51 opens under a given force but the opening process stops when the opening reaches the stronger second seal portions. This, therefore, prevents the first openable portion from opening beyond a predetermined amount without excessive force being applied.

As with the first openable portion 17, the second openable portion 55 has the basic seal between the films, i.e. a third seal portion 56, and has the stronger, further connections 50 on each side, the fourth seal portions 57. The fourth seal portions 57 prevent the second openable portion 55 from opening beyond a second predetermined amount without excessive force being applied. The second predetermined amount in some arrangements may be less than the first opening such that the dispensing opening is larger than the vent opening but this is not essential.

The two further connections 50 at one end of the stirrer could be separate from the further connections at the other end of the pack or the two further connections 50 on each side of the channel could be continuous.

The intention is that the grippable tabs 18 remain as part of the stirrer so as not to become detached into the beverage or to be an additional litter hazard.

It will be readily appreciated that the actual shape of the pack 10 is not limited to those shown in the illustrative embodiments. The packs 10 can be of any suitable shape so as to provide a sealed volume containing a liquid. Similarly, any number of films can be utilised to form the pack provided a sealed enclosure is formed around a volume containing the product. One or more of the films can even be a rigid sheet or incorporate rigid sections in certain embodiments.

Figure 4:
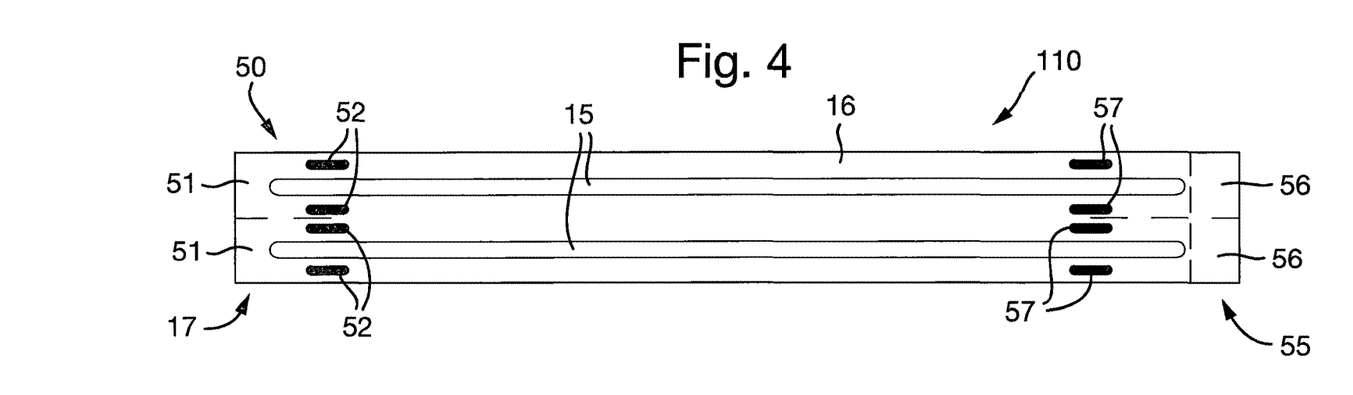
FIG. 4 is a front view of an alternative stirrer according to the present invention.
Figure 5:
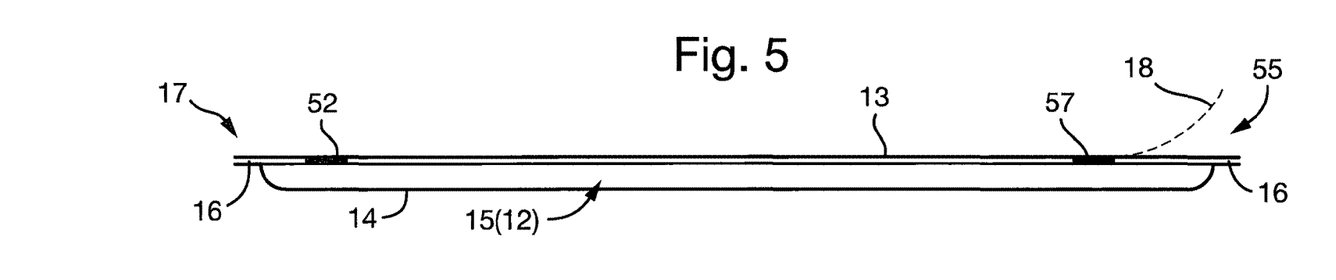
FIG. 5 is a lengthwise sectional view of the stirrer of FIG. 4.
Figure 6:
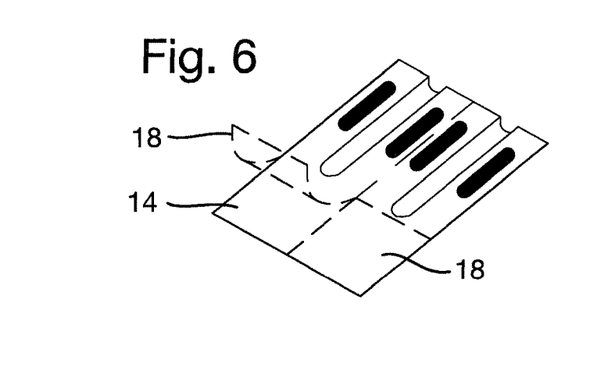
FIG. 6 is a large scale perspective view of one end of the stirrer of FIG. 4.

FIGS. 4 to 6 incorporate features of FIGS. 1 to 3 and have been given like reference numerals where appropriate. In FIGS. 4 to 6 the second film of the stirrer 110 provides a pair of spaced channels 15 disposed side by side in the lengthwise direction. (More channels could of course be provided in a similar manner). A peripheral seal 16 is provided around each channel 15 such that the liquids remain separate. The two liquids could be the same but could be different and perhaps complementary such as lemon juice and honey. Each channel 15 has its own first and second openable portions 17, 55 with grippable tab 18 such that the two channels 15 can be opened separately. (It is also possible that a single tab 18 could be used to gain access to both or more channels 15 simultaneously).

As with FIGS. 1 to 3, further connections 50 are provided at both ends of each channel 15 to limit the amount the individual tabs 18 are pulled back while retaining the tabs 18 as part of the stirrer.

Figure 7:
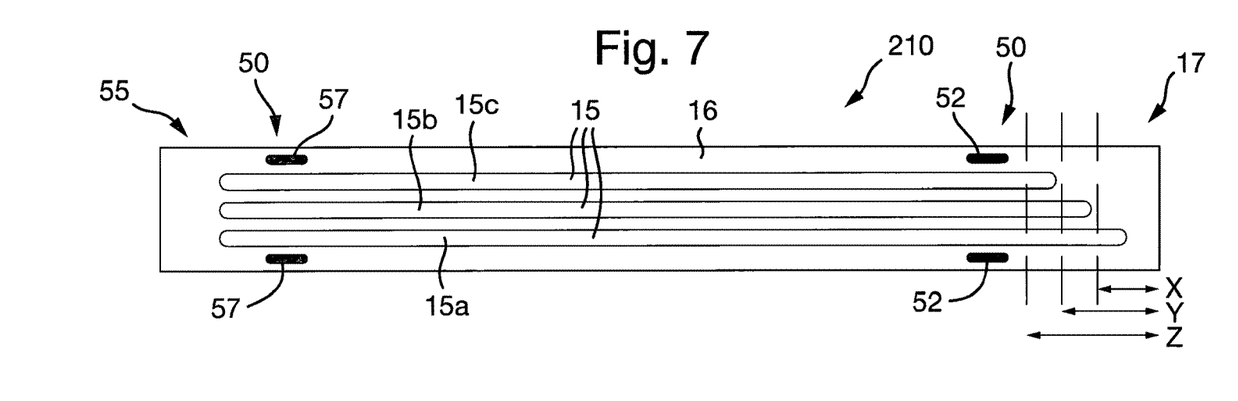
FIG. 7 is a front view of a further stirrer according to the present invention.
Figure 8:
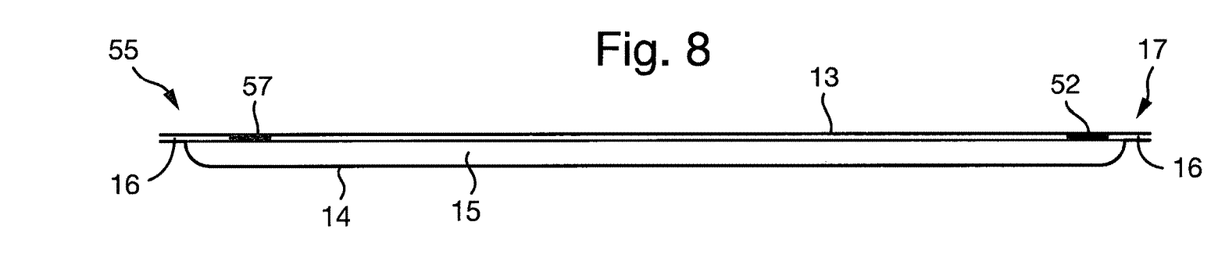
FIG. 8 is a lengthwise sectional view of the stirrer of FIG. 7.
Figure 9:
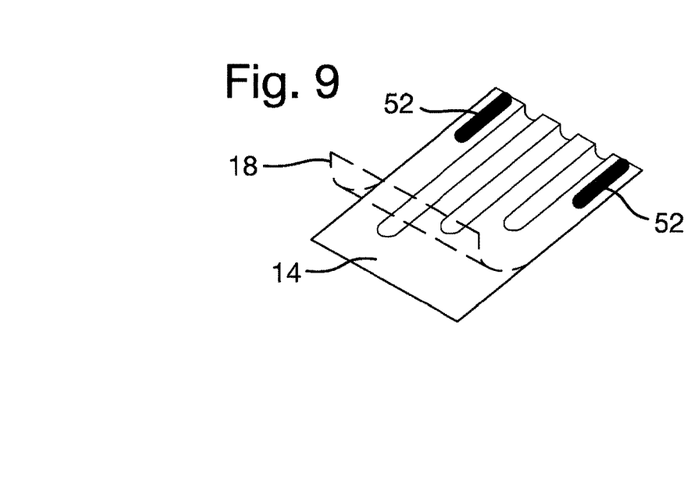
FIG. 9 is a large scale perspective view of one end of the stirrer of FIG. 7.

FIGS. 7 to 9 show an alternative stirrer 210 in which there are provided three channels 15 disposed in parallel spaced formation. The ends of the channels 15 at the first openable end of the stirrer 210 end at different lengthwise locations. In this embodiment, a single grippable tab 18 is provided, again with the further connections 50 to limit opening, but the user can peel back the tab 18 a first amount (X) to reveal the end of only one side channel 15a, a bit further (Y) to reveal also the end of the middle channel 15b and a bit further still (Z) to reveal also the end of the other side channel 15c. In this way, the user can control the amount of flow of liquid from the pack, the greater the number of channels being exposed resulting in a greater amount of liquid being dispensed from the pack. It will be appreciated that more than three channels 15 could be provided in this way or indeed just two channels with different end positions.

Figure 10:
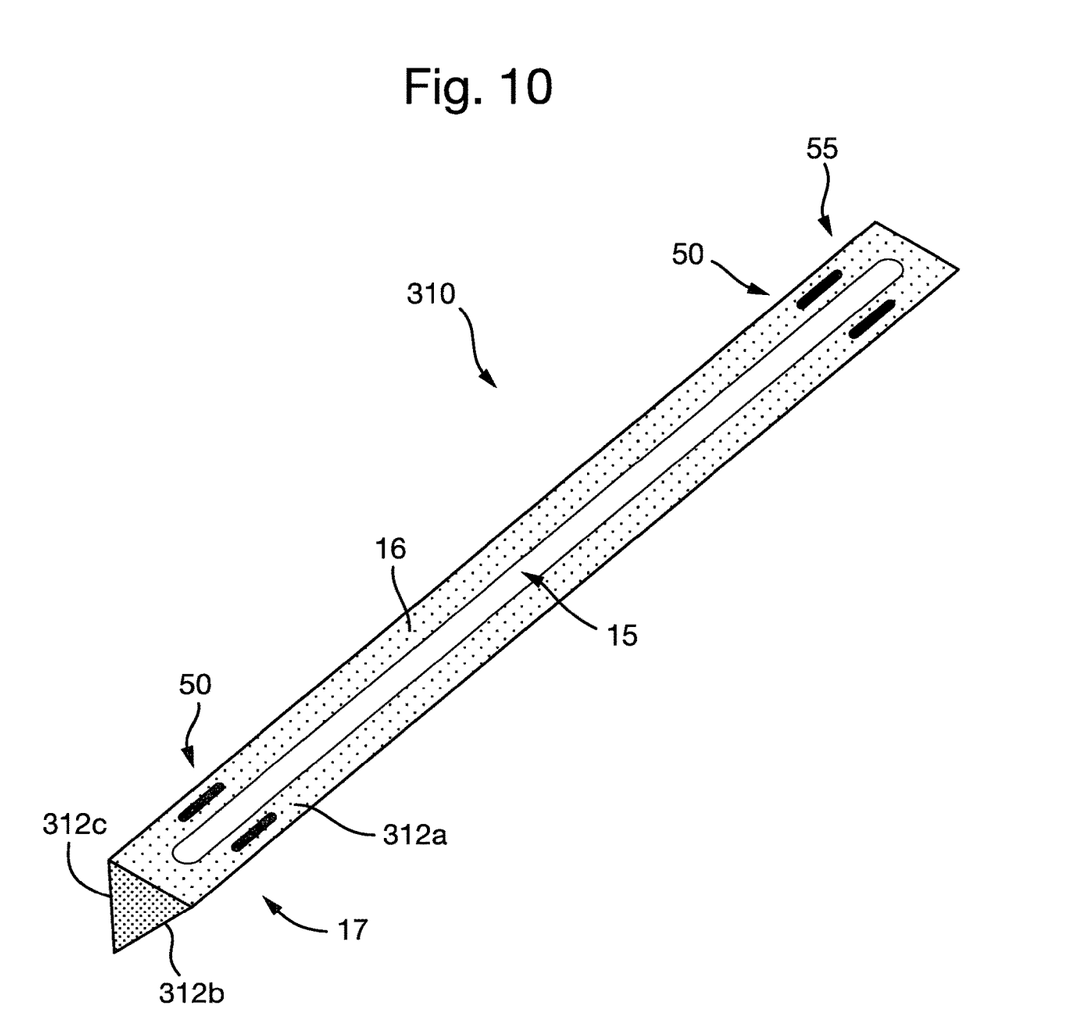
FIG. 10 is a perspective view of a still further stirrer according to the present invention.
Figure 11:
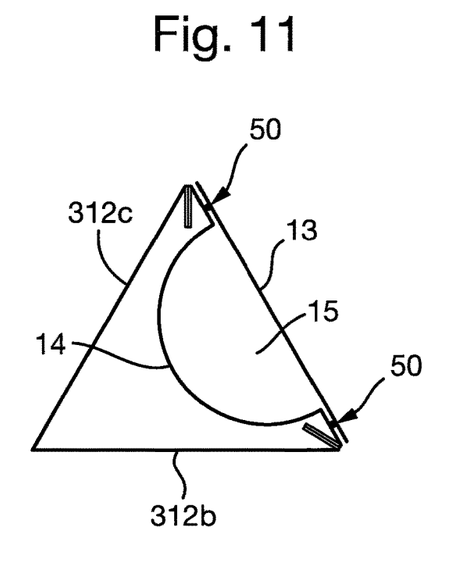
FIG. 11 is a lateral section through the stirrer of FIG. 10.

FIG. 10 shows a more complex stirrer 310 arranged as a triangular section tube 311 having three sides 312a, 312b and 312c. Such a triangular construction can have increased rigidity depending on the materials used. The tube 311 comprises three sections of second films 14 and one, two or three of the sides may provide a liquid containing volume. The three sections could be formed separately and joined together or formed from a single, folded second film 14 connected to itself along one lengthwise edge. FIG. 11 shows a single, large sectioned channel 15 for containing a liquid, the channel being sealed by a first film 13 with a peripheral seal as described above and with further connections 50 to limit the amount of opening of the first and second openable portions at the ends of the stirrer. The bulge of the channel 15 is neatly accommodated within the triangular section of the tube.

Figure 12:
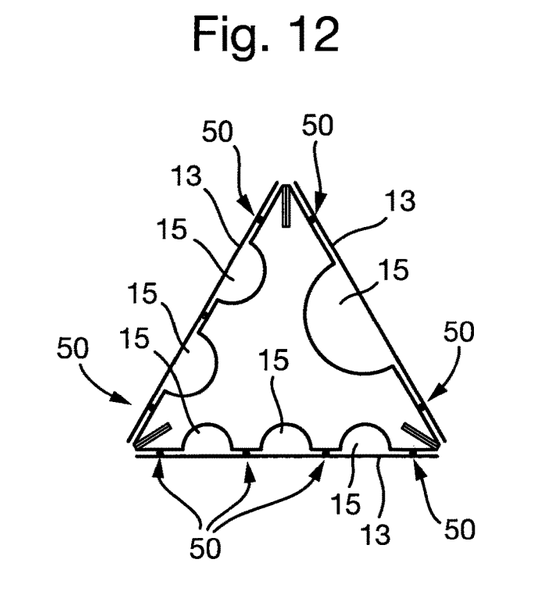
FIG. 12 is a lateral section through an alternative stirrer similar to FIG. 10.

FIG. 12 shows a more complicated arrangement in which all three sides incorporate liquid containing channels 15 and each side has one or more first films 13 to seal the channels provided therein. As shown, one side has one large channel 15, another side has two smaller channels 15 and the third side has three channels 15. It will be readily appreciated that any number of combinations are possible and that the tube 311 could have other polygonal cross-sections such as rectangular, pentagonal, hexagonal etc.

Figure 13:
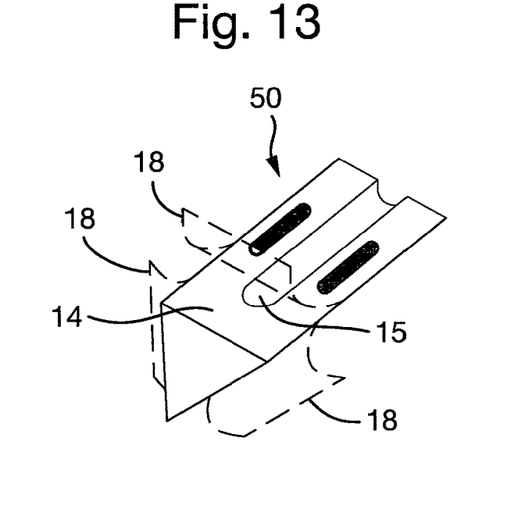
FIG. 13 is a simplified perspective view of an end of the stirrer of FIG. 12.

FIG. 13 shows the grippable tabs 18 at one end of the stirrer 310 being opened to reveal the ends of the channels.

In an alternative arrangement (not shown) a stirring device could comprise a holder, perhaps made of plastic or metal, to which a number of individual stirrers 10, as shown in FIGS. 1 to 3 for example, can be attached. For example, a holder could be arranged to hold three individual stirrers in a triangular array similar to that illustrated in FIGS. 10 to 13 although other arrays would also be possible. Attachment could be by suitable retaining means such as clips or the individual stirrers 10 could slide into position via suitable guide slots. The holder could be re-usable or disposable and would enable the end user to choose a selection of liquid supplements from a range offered at a point of sale.

Figure 14:
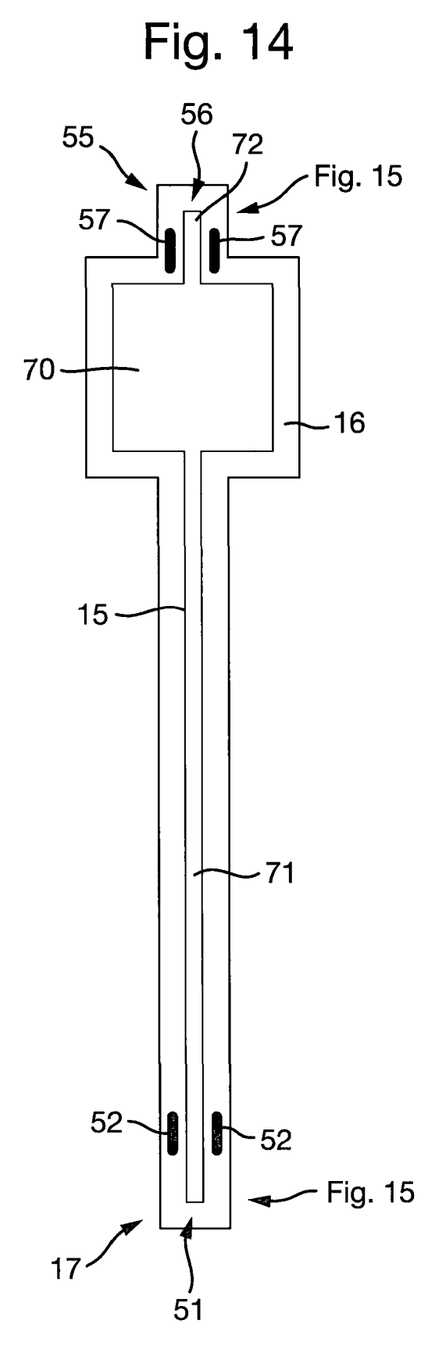
FIG. 14 is a front view of another stirrer according to the present invention.
Figure 15:
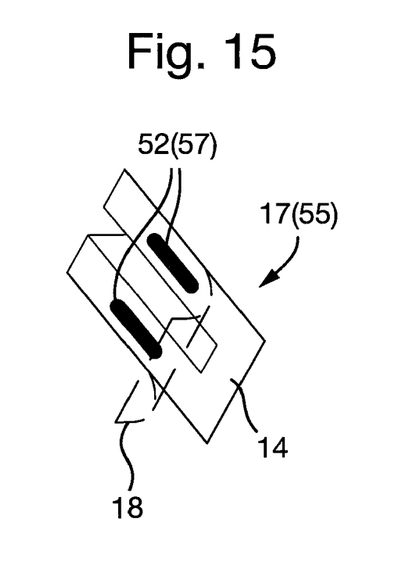
FIG. 15 is a large scale perspective view of one end of the stirrer of FIG. 14.

FIGS. 14 and 15 show an alternative configuration of the invention which still incorporates the basic features. The stirrer 10 has first and second films 13, 14 which are sealed around their periphery to sealingly enclose a volume in which a liquid is retained.

The volume has a main volume 70 and an elongate secondary volume 71 which is in communication with the main volume 70 at one end and has at its other end the first openable portion 17. Again, this openable portion may include one or more grippable tabs 18 to enable the films 13, 14 to be peeled apart to enable the liquid to be dispensed. Oppositely disposed to the secondary volume 71 is a tertiary volume 72 which again is in communication with the main volume 70 at one end and has at its other end a second openable portion 55 which also provides one or more grippable tabs 18 in order to make the second opening.

In the basic arrangement illustrated, the main, secondary and tertiary volumes 70, 71, 72 are formed in a shaped channel in the second film 14 which has sufficient structural integrity to maintain these volumes in the form of a main cupped section 70 and elongate channels to constitute the secondary and tertiary volumes 71, 72. The first film 13 seals all around the edges of the second film 14 by means of heat sealing or welding or adhesive as discussed above. As above, further stronger connections 50 are provided to limit the openings of the openable portions and to prevent detachment of the tabs 18 after opening.

One particular use of the FIG. 14, 15 arrangement is with tea and coffee vendors. The liquid held in the volume may include one or more of a number of additives or flavours or herbal remedies which can be released into a hot or even cold beverage.

The provision of top and bottom (second and first) openable portions in the above-described stirrers allows the liquid to drain from the or each volume and preferably one or both films are flexible enough to allow squeezing of the pack to remove remaining liquid. The stirrers described above could contain substances that are liquid at room temperature or become liquid at an elevated temperature of the sort of level found in hot beverages or the packs could be frozen such that the frozen liquid thaws when used in a hot or cold beverage. For example, the packs could contain lemon juice or a honey/lemon juice combination for gradual infusion into a tea. Even some medicines/herbal remedies could be incorporated to provide, for example, over-the-counter cold relief products.

It will also be appreciated that other sub-volumes could be incorporated in a more complex product. The different sub-volumes could initially contain different liquid products for dispensing through the first openable portion.

In practical terms, in the arrangements of FIGS. 1 to 15, the stirrer 10 has sufficient rigidity along its length such that the pack retains its elongate shape during use through all operating temperatures. The stirrer can therefore operate effectively as a stirrer for beverages, perhaps using the pack in the region of the second openable portion 55, or the tertiary volume 72 when provided, as a handle, whilst simultaneously dispensing the enclosed liquid from the first openable portion 17 which is immersed in a hot or cold or ice-laden beverage. In preferred arrangements, one or both films 13, 14 are made sufficiently rigid by suitable choice of plastic material and/or the thickness of such material. In other arrangements, both films could be substantially flexible with one or both films being provided with a sufficiently rigid spine or spines such that the stirrer retains its elongate shape.

The invention claimed is:

1. A stirrer comprising a sealed package which holds therein a liquid and which comprises a first film and a second film sealingly joined to each other, said films being fluid tight and fully enclosing therebetween an elongate volume in which the liquid is sealingly retained, wherein the package has a first openable portion at one end and a second openable portion at an opposite end such that when both openable portions are opened the liquid is able to flow out of the opened first openable portion and the second openable portion acts as a vent, wherein each openable portion comprises at least one of the two films having a grippable tab which can be manipulated to peel apart the joint between the films, wherein the joint between the films is weaker in the region of each openable portion compared to the joint on sides of the openable portion, thereby resisting separation of the films beyond a predetermined amount at each openable portion, wherein the stirrer comprises one or more further sealed elongate volumes, each having a first and a second openable portion and each containing a liquid, wherein the sealed elongate volumes extend in a same lengthwise direction as each other and are laterally offset from each other, wherein the openable portions of each elongate volume are separately openable to dispense separately the individual liquids contained in the elongate volumes, wherein a length of each elongate volume is different such that the first openable portions are at different locations in the lengthwise direction, and wherein a single grippable tab of at least one of the two films opens the first openable portions sequentially.

2. A stirrer as claimed in claim 1 wherein the films are made from food-grade plastics materials, the first film is flexible and the second film is sufficiently rigid to maintain its shape during and after dispensing of the liquid via the first openable portion.

3. A stirrer as claimed in claim 1 wherein the joint between the first and second films includes a first seal portion in the region of the first openable portion which is relatively weak compared to second seal portions on each side of the first seal portion whereby the second seal portions effect said resistance to further separation to limit the opening of the first openable portion.

4. A stirrer as claimed in claim 3 wherein the joint between the first and second films includes a third seal portion in the region of the second openable portion which is relatively weak compared to fourth seal portions on each side of the third seal portion whereby the fourth seal portions effect said resistance to further separation to limit the opening of the second openable portion.

* * * * *